United States Patent
Wagstaffe

(12) 
(10) Patent No.: US 6,708,814 B2
(45) Date of Patent: Mar. 23, 2004

(54) FOLDING MECHANISM FOR A TWO PART ENDLESS CONVEYOR

(75) Inventor: Christopher William Wagstaffe, Swadlincote (GB)

(73) Assignee: Extec Industries, PLC (GB)

( * ) Notice: Subject to any disclaimer, the term of this patent is extended or adjusted under 35 U.S.C. 154(b) by 0 days.

(21) Appl. No.: 10/169,597

(22) PCT Filed: Nov. 1, 2001

(86) PCT No.: PCT/GB01/04857

§ 371 (c)(1), (2), (4) Date: Sep. 30, 2002

(87) PCT Pub. No.: WO02/36461

PCT Pub. Date: May 10, 2002

(65) Prior Publication Data

US 2003/0121761 A1 Jul. 3, 2003

(30) Foreign Application Priority Data

Nov. 4, 2000 (GB) ................................. 0027129

(51) Int. Cl.[7] .................. B65G 21/10; B65G 37/00; B65G 41/00
(52) U.S. Cl. .................. 198/632; 198/581; 198/861.2
(58) Field of Search .............. 198/314, 581, 198/632, 861.2, 861.3

(56) References Cited

U.S. PATENT DOCUMENTS

| | | | |
|---|---|---|---|
| 3,599,784 A | 8/1971 | Rossi | 198/233 |
| 3,616,893 A * | 11/1971 | Knadle et al. | 198/632 |
| 4,427,104 A | 1/1984 | Reid, Jr. | 198/306 |
| 4,923,359 A * | 5/1990 | Petri et al. | 198/861.3 |
| 5,443,351 A * | 8/1995 | Pettijohn | 198/632 |
| 6,129,196 A * | 10/2000 | Lapper et al. | 198/313 |

* cited by examiner

Primary Examiner—Gene O. Crawford
(74) Attorney, Agent, or Firm—Madson & Metcalf

(57) ABSTRACT

A two part endless conveyor which is adjustable between an in-line operative position and a folded position. The conveyor has two folding conveyor parts which are mounted to the frame of a material handling apparatus. A folding mechanism interconnects the two conveyor parts. It includes a coupling block or linkage which interconnects the two folding conveyor via a respective one of a pair of pivots and a pair of linear actuators associated with the conveyor parts. Each actuator rotates the coupling block through approximately 90° about the respective pivot, whereby the folding mechanism, under the action of the two linear actuators, can adjust the conveyor parts between the in-line operative position and the folded transport position.

11 Claims, 2 Drawing Sheets

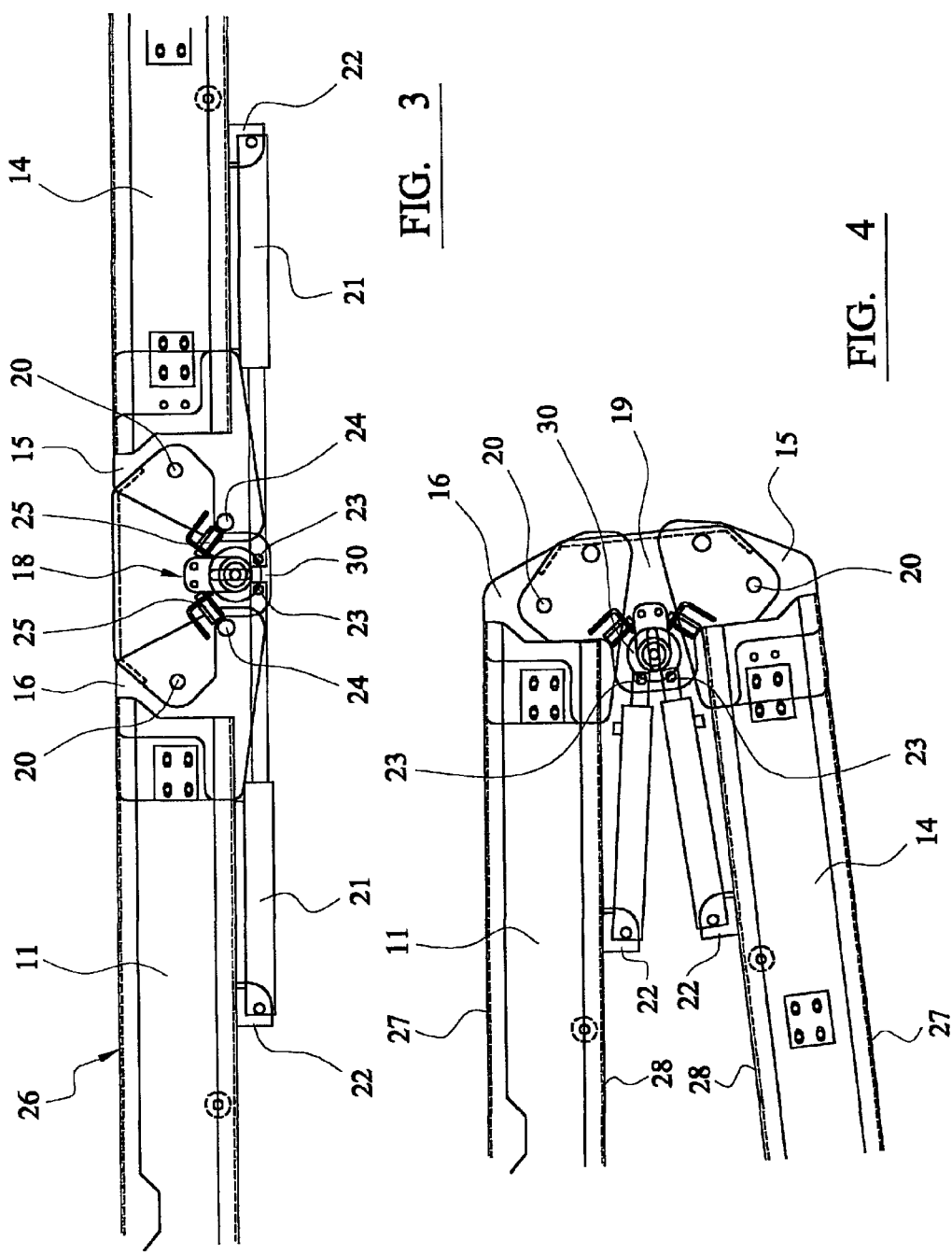

FOLDING MECHANISM FOR A TWO PART ENDLESS CONVEYOR

This invention relates to a two part endless conveyor which is adjustable between an operative position in which one conveyor part forms a prolongation of the other conveyor part, and a folded transport position in which the two conveyor parts extend generally parallel to, and are located one above the other.

Endless conveyor belts have many uses, in order to convey material from one place to another, but a requirement for a folding facility is usually only necessary to be provided on apparatus which is intended to be transported from one site to another. Thus, a transportable apparatus has an operative state in which any endless conveyors provided thereon may project from the apparatus in order to discharge material to deposition zones spaced from the apparatus, but which can be folded to transport positions in which the overall length and/or height of the apparatus is reduced i.e. the overall "envelope" of the apparatus is reduced in size so as to render the apparatus suitable for being transported from one site to another. Transport may be via a low loader, or via a fifth wheel coupling in the case of a wheeled apparatus.

The invention has been developed primarily in connection with a two part endless conveyor which is intended to be mounted on the frame of a transportable material treatment (processing/handling) apparatus, such as a mobile screening and/or crushing plant, and which is operative when in a deployed mode to discharge treated material to a required deposition zone.

In the case of a screening plant, it is usual to have one or more discharge conveyor which can be adjusted between an operative position in which it projects rearwardly, or to one side of the apparatus (usually referred to as a "tail conveyor" or a "side conveyor" respectively), but which can be folded so as to take up a transport position in which the overall envelope of the apparatus (including the discharge conveyor (s)) is reduced in size so that the apparatus can be transported along a public highway.

In the case of a tail conveyor, it is known to design the conveyor in two parts, of which a first part (the head part) is pivotally mounted on the frame of the apparatus so as to be adjustable to an operative position in which any required upward and rearward inclination of the entire conveyor can be set, so that a stockpile of material can be formed rearwardly of the apparatus. The tail conveyor also has a second part (the tail part) which forms a prolongation of the first part in the operative position, but can be folded to a transport position in which one part overlies the other part. In the transport position, it may be the tail part overlying the head part, or vice versa.

The head part may also be downwardly adjustable about its pivotable mounting on the frame, in the transport position, in order to further reduce the overall height of the conveyor, as well as to reduce its overall length when the two conveyor parts are folded to the transport position.

The present invention is primarily concerned with an improved folding mechanism which is operative to adjust a two part discharge conveyor of a mobile material treatment apparatus between a transport position and a deployed position. However, it should be understood that the improved folding mechanism of the invention has general application to a two part endless conveyor for use in other suitable apparatus.

According to the invention there is provided a two part endless conveyor which is adjustable between an in-line operative position, and a folded transport position, and which comprises:

a first conveyor part which is adapted to be mounted at a first end on the frame of a material handling apparatus;

a second conveyor part which is adjustably mounted at a first end on an opposite second end of the first conveyor part for movement between an operative position in which the second conveyor part forms a prolongation of the first conveyor part and so that the opposite second end of the second conveyor part forms a discharge end of the conveyor, and a transport position in which one of the conveyor parts underlies the other conveyor part and extends generally parallel thereto; and a folding mechanism which interconnects the second end of the first conveyor part to the first end of the second conveyor part, said mechanism comprising:

a coupling block or linkage which interconnects the second end of the first conveyor part and the first end of the second conveyor part via respective ones of a pair of pivot connections; and a pair of linear actuators each associated with a respective conveyor part and extending between a mounting point on the conveyor part and the coupling block, each actuator being operative to rotate the coupling block through approximately 90° about the respective pivot connection whereby the folding mechanism, under the action of the two linear actuators, can adjust the first and second conveyor parts between the in-line operative position and the folded transport position.

The folding mechanism therefore provides a coupling block which is relatively rotatable through approximately 90° relative to the second end of the first conveyor part via a respective pivot connection, and also is rotatable relatively through approximately 90° about a respective pivot connection to the first end of the second conveyor part. Therefore, with a relatively simple construction, the two conveyor parts can be readily adjusted between the operative or deployed position, and the folded transport position, in which the overall length of the conveyor is substantially reduced, while at the same time taking up relatively small space, since the conveyor parts are arranged one above the other, and generally parallel to each other.

A two part endless conveyor according to the invention therefore is particularly suitable for use as a discharge conveyor, and more particularly a tail conveyor mounted below a screening plant on a mobile screening apparatus, in which space is available below the screening plant which can be occupied by the tail conveyor when folded to its transport position.

In a preferred arrangement, the first conveyor part is the head part of a tail conveyor, and which is adapted to be pivotally mounted on the frame of the screening apparatus, and can be pivoted about its mounting point in order to set any required overall inclination of the tail conveyor when in the deployed position, so that the second end of the second conveyor part (the tail part) is at a required height so that a stockpile of screened material can be formed at a required location spaced from the apparatus.

An endless conveyor has an upper conveyor run and a lower conveyor run, and it is usual to provide guide or transfer rollers which facilitate the movement of the belt along an endless path. Evidently, when the two conveyor parts are folded to the transport position, this has an effect on the endless belt, and it is therefore preferred that a guide arrangement be provided in the general region of the connection between the two conveyor parts, and which is able to guide the lower conveyor run, during the folding movement, and also when the folded transport position is reached, so as to apply tension to the lower conveyor run, and thereby at least minimise the risk of slack portions of the conveyor belt being formed. Conveniently, the guide arrangement comprises a roller mounted on the coupling block, and which is engagable with the lower conveyor run, both in the operative position, and in the transport position, and during adjustment movement of the conveyor parts.

Any suitable linear actuator may be provided, to interact between each conveyor part and a suitable connection point with the coupling block, although it will be preferred to use a piston/cylinder device, and preferably a hydraulically operated device.

The piston cylinder devices may be arranged in a common hydraulic circuit, in parallel with each other, or may have separate hydraulic circuits. The devices may operate in sequence i.e. independently of each other, or simultaneously.

A preferred embodiment of two part endless conveyor according to the invention will now be described in detail, by way of example only, with reference to the accompanying drawings, in which:

FIG. 3 is a detail and enlarged view showing a folding mechanism, interconnecting adjacent ends of the conveyor parts, and in the deployed position; and FIG. 4 is a detail and enlarged view showing the adjustment of the folding mechanism so as to adjust the conveyor parts to the transport position.

Figure 1:
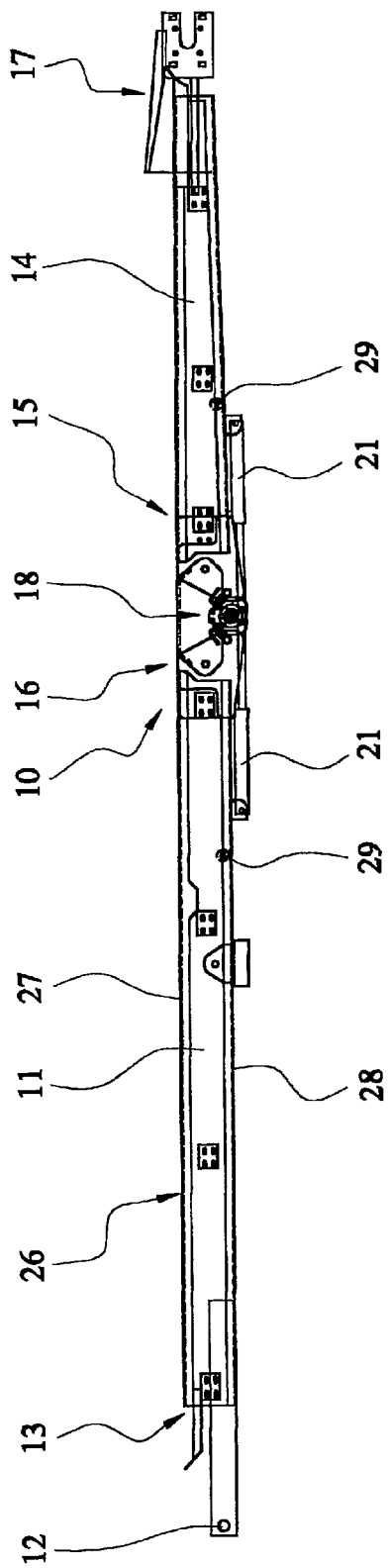
FIG. 1 is a side view of a two part endless conveyor according to the invention, and taking the form of a tail conveyor for mounting on the frame of a material treatment apparatus, and showing the conveyor in a deployed position in which the head and tail parts of the conveyor are in line with each other i.e. the tail part forms a prolongation of the head part.
Figure 2:
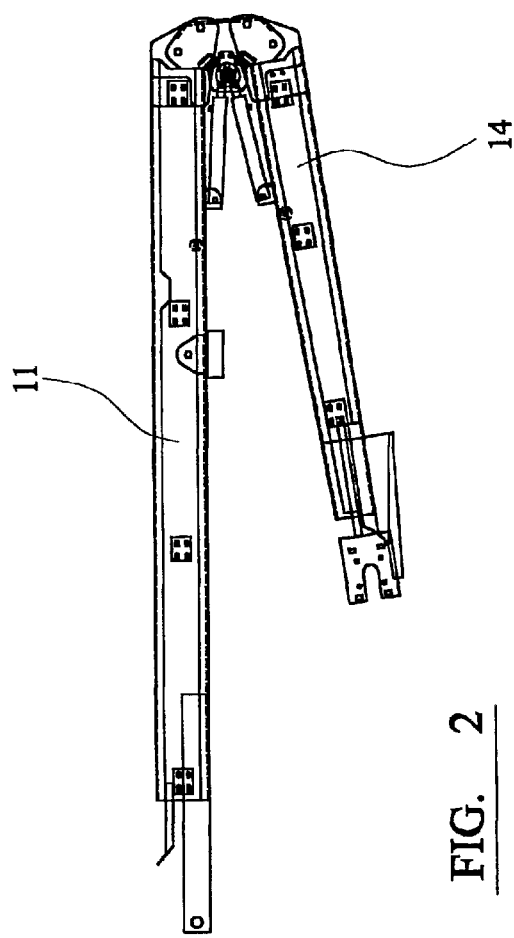
FIG. 2 is a side view showing the conveyor parts folded to a transport position, in which the head part underlies the tail part, and extends generally parallel thereto.

Referring first to FIGS. 1 and 2 of the drawings, these are side views of the overall length of a two part endless conveyor according to the invention, designated generally by reference 10, and which may take the form of a tail conveyor intended to be mounted on the frame (not shown) of a material treatment apparatus, such as a mobile or transportable screening and/or crushing plant.

The conveyor 10 has a first conveyor part 11, which is the "head part", and which has a pivotable mounting 12 at a first end 13 of the conveyor part 11, by means of which the entire conveyor 10 can be pivotally mounted on the frame of the apparatus. A second conveyor part 14, comprising the tail part, is adjustably mounted at a first end 15 on an opposite second end 16 of the first conveyor part 11. The conveyor parts 11 and 14 are relatively adjustable between an in-line operative or deployed position, as shown in FIG. 1, and a folded transport position shown in FIG. 2. In the operative position, the second conveyor part 14 forms a prolongation of the first conveyor part 11, and the opposite second end 17 of the second conveyor part 14 forms the discharge end of the overall conveyor 10. In the folded transport position, the second conveyor part 14 underlies the first conveyor part 11, and extends generally parallel thereto, so that the folded conveyor 10 has reduced overall length, and also takes up a relatively small space in the folded position, which is particularly suitable when mounting the conveyor 10 below a screen box of a mobile screening plant.

FIGS. 1 and 2 show the overall length of the conveyor 10, and FIGS. 3 and 4 are corresponding illustrations, to an enlarged scale, showing the folding mechanism interconnecting the adjacent ends 15 and 16 of the conveyor parts 14 and 11.

The folding mechanism is designated generally by reference 18, and comprises a coupling block or linkage 19 which interconnects the second end 16 of the first conveyor part 11 and the first end 15 of the second conveyor part 14 via respective ones of a pair of pivots 20.

The mechanism 18 also includes a pair of linear actuators 21, each associated with a respective one of the conveyor parts 11, 14, and extending between mounting points 22 on the conveyor parts 11 and 14, and pivot connections 23 to the coupling block 19.

Each actuator 21, preferably taking the form of a piston cylinder device (though other linear actuators may be used) is operative to rotate the coupling block 19 through approximately 90° about the respective pivot 20, and therefore a combined relative rotation between the conveyor parts 11 and 14 of approximately 180° can be achieved, for movement between the deployed position, and the transport position.

Removable locking pins 24 are provided, to maintain the conveyor parts 11 and 14 in the deployed position, and levelling bolts 25 are mounted on the coupling block 19, and engagable with the locking pins 24. Adjustment of the levelling bolts 25 permit fine adjustment in the relative inclination between the conveyor parts 11 and 14, when in the deployed position.

Referring back to FIGS. 1 and 2, the endless conveyor 10 includes an endless conveyor belt 26 having an upper run 27 and a lower run 28, and guide rollers are mounted on the frames of the conveyor parts 11 and 14, to guide the movement of the endless belt 26 on an endless path. Guide rollers 29 are shown guiding the movement of the lower run 28.

Evidently, when the two conveyor parts 11 and 14 are in the deployed position, the endless belt 26 is maintained under tension, but upon pivotting of the conveyor part 14 to the transport position this will result in release of tension in the lower run 28, and therefore there may be a tendency for slack portions of belts to form, and especially in the region of the folding mechanism 18, and this is undesirable. Therefore, at least to minimise this problem, a roller 30 is mounted on the coupling block 19, and serves to guide the lower run 28 of the endless conveyor belt 26, and seeks to maintain tension in the lower run, (during movement between the operative position and the transport position), or at least guidance for the endless belt 26 when in the transport position, thereby avoiding, or at least minimising the formation of slack portion of belt, which might otherwise hang downwardly from the endless conveyor.

The illustrated embodiment provides a very satisfactory folding mechanism between two adjacent ends of a folding conveyor, and without generation of slack portions of belt falling downwardly under gravity during movement to the transport position, and it is believed that this technical advantage arises directly out of the design parameters of the folding mechanism. In particular, it will be noted that the pivots 20 are located substantially mid height of the respective conveyor parts i.e. approximately midway between the upper and lower belt runs, and this has a favourable influence on the force which is applied to the endless belt during the folding and unfolding process. The provision of the roller 30 also has a favourable influence on the control of tension, and guidance of the lower run of the conveyor belt, during both folding, and unfolding movement. The roller 30, which may be considered to be a return roller, is located internally on the linkage centre line.

Also, the means disclosed to permit underfolding, as applied to a "tail conveyor", provides a length advantage i.e.

reduction of about 0.5 meters, which is a significant factor in complying with traffic regulations.

What is claimed is:

1. A two part endless conveyor which is adjustable between an in-line operative position, and a folded transport position, and which comprises:

a first conveyor part which is adapted to be mounted at a first end on the frame of a material handling apparatus;

a second conveyor part which is adjustably mounted at a first end on an opposite second end of the first conveyor part for movement between an operative position in which the second conveyor part forms a prolongation of the first conveyor part and so that the opposite second end of the second conveyor part forms a discharge end of the conveyor, and a transport position in which one of the conveyor parts underlies the other conveyor part and extends generally parallel thereto, and a folding mechanism which interconnects the second end of the first conveyor part and the first end of the second conveyor part said mechanism comprising:

a coupling block or linkage which interconnects the second end of the first conveyor part and the first end of the second conveyor part via a respective one of a pair of pivots; and a pair of linear actuators each associated with a respective conveyor part and extending between a mounting point on the conveyor part and a connection to the coupling block, each actuator being operative to rotate the coupling block through approximately 90° about the respective pivot, whereby the folding mechanism, under the action of the two linear actuators, can adjust the conveyor parts between the in-line operative position and the folded transport position.

2. A conveyor according to claim 1, in which the conveyor is mounted on a material processing apparatus.

3. A conveyor according to claim 1, in which the pivots are located substantially mid height of the respective first and second conveyor part.

4. A conveyor according to claim 1, wherein the conveyor is a tail conveyor for mounting on the frame of a material processing apparatus, wherein the first conveyor part is a head part adapted to be mounted on the frame, and the second conveyor part is a tail part of the conveyor.

5. A conveyor according to claim 4, in which the conveyor is adjustable about a mounting part at the first end of the head part, to vary the inclination of the conveyor when in the operative position.

6. A conveyor according to claim 1, including a guide arrangement mounted in the folding mechanism and operative to guide the lower run of an endless belt extending along an endless path around the conveyor parts, said guide arrangement being operative to apply tension to the lower run of the endless belt during relative movement of the conveyor parts between the operative position and the transport position.

7. Conveyor according to claim 6, in which the guide arrangement comprises a roller which is mounted on the coupling block or linkage for movement therewith.

8. A conveyor according to claim 7, in which the roller is mounted internally on the centre line of the coupling block or linkage.

9. A conveyor according to claim 1, in which each linear actuator comprises a piston/cylinder device.

10. A conveyor according to claim 9, in which the piston/cylinder devices are hydraulically operable.

11. A conveyor according to claim 10, in which the piston/cylinder devices are operable independently, or simultaneously.

* * * * *